(12) United States Patent
Seybold et al.

(10) Patent No.: US 11,883,918 B2
(45) Date of Patent: Jan. 30, 2024

(54) MEASURING SYSTEM FOR MONITORING A SPINDLE

(71) Applicant: Schaeffler Technologies AG & Co. KG, Herzogenaurach (DE)

(72) Inventors: Alexander Seybold, Bischberg (DE); Christoph Wegner, Gochsheim (DE); Stefan Glück, Schweinfurt (DE); Andreas Schiffler, Erlangen (DE); Martin Voll, Haßfurt (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 952 days.

(21) Appl. No.: 16/757,449

(22) PCT Filed: Oct. 22, 2018

(86) PCT No.: PCT/DE2018/100861
§ 371 (c)(1),
(2) Date: Apr. 20, 2020

(87) PCT Pub. No.: WO2019/080965
PCT Pub. Date: May 2, 2019

(65) Prior Publication Data
US 2021/0187684 A1 Jun. 24, 2021

(30) Foreign Application Priority Data
Oct. 23, 2017 (DE) .................. 10 2017 124 667.3

(51) Int. Cl.
*B23Q 17/09* (2006.01)
*B23Q 17/22* (2006.01)
*B23Q 1/00* (2006.01)

(52) U.S. Cl.
CPC ....... *B23Q 17/2275* (2013.01); *B23Q 1/0009* (2013.01); *B23Q 17/0966* (2013.01)

(58) Field of Classification Search
CPC .............. B23Q 17/2275; B23Q 1/0009; B23Q 17/0966; B23Q 17/22; G01B 21/16; G01D 5/20; G01P 1/02
See application file for complete search history.

(56) References Cited

U.S. PATENT DOCUMENTS

| | | | |
|---|---|---|---|
| 9,314,891 B2 * | 4/2016 | Veittinger | B23Q 1/0009 |
| 9,518,876 B2 * | 12/2016 | Wulff | G01L 3/108 |
| 10,286,514 B2 * | 5/2019 | Hasegawa | G05B 19/4065 |
| 10,369,673 B2 * | 8/2019 | Veittinger | B23Q 5/043 |
| 10,967,473 B2 * | 4/2021 | Ruf | B23Q 17/005 |
| 11,123,834 B2 * | 9/2021 | Van Sprang | G01B 7/30 |

(Continued)

FOREIGN PATENT DOCUMENTS

| | | |
|---|---|---|
| CN | 103769652 | 5/2014 |
| CN | 106926058 | 7/2017 |

(Continued)

*Primary Examiner* — Yaritza Guadalupe-McCall

(57) ABSTRACT

A measuring system monitors a spindle. The measuring system includes a cylindrical housing which can be arranged in and mechanically firmly connected to a spindle housing. A carrier ring is arranged inside the cylindrical housing. Three sensors for measuring a radial displacement and three sensors for measuring an axial displacement of the spindle are distributed over a circumference of the carrier ring. The sensors are cast with the carrier ring.

20 Claims, 1 Drawing Sheet

(56) References Cited

U.S. PATENT DOCUMENTS

| | | | | |
|---|---|---|---|---|
| 11,181,443 | B2* | 11/2021 | Bachmann | F16C 19/527 |
| 2007/0063620 | A1* | 3/2007 | Kluft | B23Q 1/265 |
| | | | | 310/338 |
| 2009/0299663 | A1* | 12/2009 | Butz | G01M 13/045 |
| | | | | 702/56 |
| 2012/0109539 | A1* | 5/2012 | Hasegawa | F16C 19/522 |
| | | | | 702/34 |
| 2016/0061637 | A1* | 3/2016 | Aichriedler | G01P 3/487 |
| | | | | 324/207.12 |
| 2019/0061085 | A1* | 2/2019 | Jung | B23Q 17/0966 |
| 2020/0001419 | A1* | 1/2020 | Ruf | B23Q 17/005 |
| 2021/0187684 | A1* | 6/2021 | Seybold | B23Q 17/2275 |

FOREIGN PATENT DOCUMENTS

| | | |
|---|---|---|
| CN | 206567922 | 10/2017 |
| DE | 10149642 A1 | 4/2003 |
| DE | 10351347 A1 | 7/2004 |
| DE | 10348608 B4 | 5/2005 |
| DE | 10348608 B4 | 5/2016 |
| EP | 1425640 B1 | 6/2004 |
| EP | 1764186 A1 | 3/2007 |
| EP | 2759369 A1 | 7/2014 |
| JP | H08304571 | 11/1996 |
| JP | 2011240415 | 12/2011 |
| JP | 2013195419 | 9/2013 |
| JP | 2014512678 | 5/2014 |
| JP | 2014144531 | 8/2014 |
| WO | 201502908 | 1/2015 |

\* cited by examiner

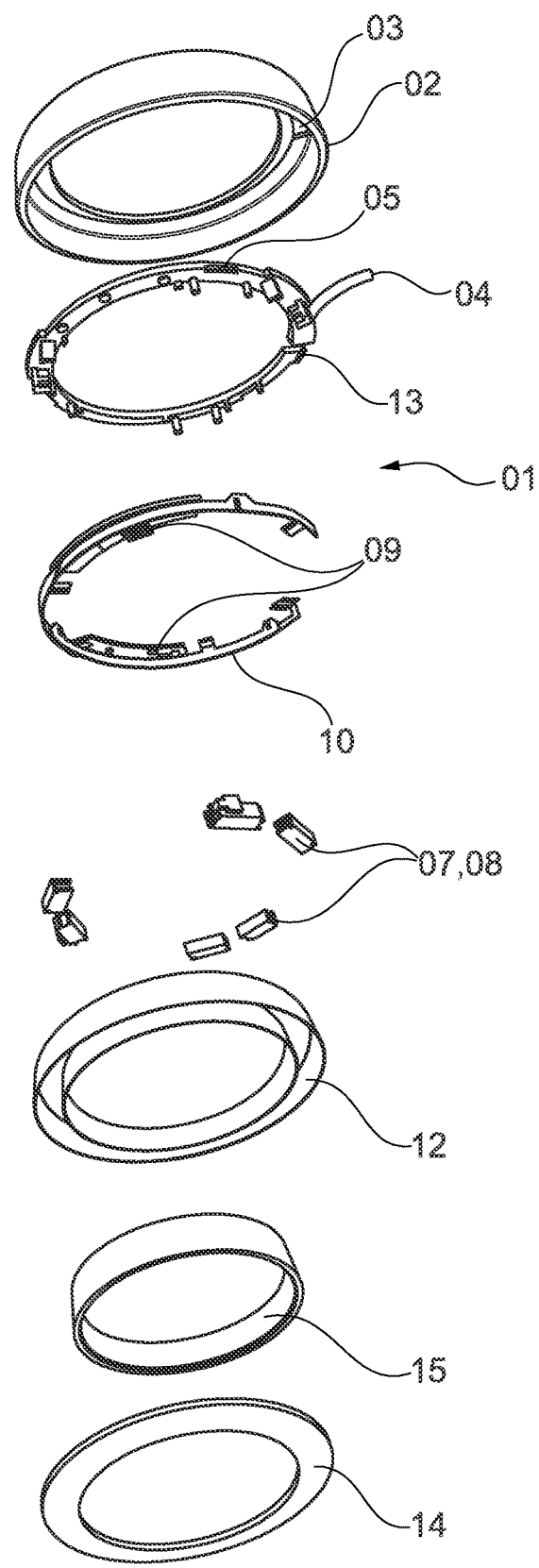

MEASURING SYSTEM FOR MONITORING A SPINDLE

CROSS-REFERENCE TO RELATED APPLICATIONS

This application is the U.S. National Phase of PCT Appln. No. PCT/DE2018/100861 filed Oct. 22, 2018, which claims priority to DE 10 2017 124 667.3 filed Oct. 23, 2017, the entire disclosures of which are incorporated by reference herein.

TECHNICAL FIELD

The present disclosure relates to a measuring system for monitoring a spindle.

BACKGROUND

DE 103 48 608 B4 discloses a monitoring system for a spindle device, comprising a first sensor, for detecting a rotational speed of the spindle device, and a second sensor, for detecting a temperature of the spindle device. The monitoring system additionally includes a classifier means, by which the state of the spindle device is classified on the basis of the sensor data. An evaluation means is used to forecast a maintenance requirement of the spindle device, by means of a model, on the basis of the sensor data and of predetermined limit values and the classified condition.

EP 1 425 640 B1 describes a monitoring system for in-process monitoring of tools, workpieces or machining processes in chip-removing machine tools. The system comprises at least one sensor for the acquisition of measurement signals from the machining process, which are equated to at least one direction of force, a resultant force, a pressure, a torque, a motor power, a motor current, a vibration, an acceleration, a structure-borne noise or a change in distance between two machine parts. Another component of the system is a monitoring hardware, having software for storing and comparing monitoring data in tool-specific or cut-specific monitoring stages. In the case of measurement signals that breach predefined monitoring thresholds, appropriate actions are triggered. An operating hardware, with software, is used to operate or parameterize the monitoring system, or to visualize the measurement signals.

The so-called Spindle Condition Monitoring System (SpiCoM) for machine tool spindles is known from the company FAG Kugelfischer Georg Schafer AG. The main component of SpiCoM is a measuring ring, which can be integrated into the spindle and which contactlessly measures the relative displacements and tilts, in all spatial directions, between the shaft and housing. The measuring ring comprises an inner ring mechanically connected to the spindle, and an outer sensor ring fastened to the spindle housing. There are three radial and three axial eddy-current sensors, each offset by 120° in relation to each other, integrated into the sensor ring. The inner ring consists of a target ring, having axial and radial measuring surfaces, which is mounted on a steel carrier ring.

SUMMARY

It is desirable to provide an optimized measuring system for monitoring spindles, based on the known SpiCoM system, which is transferable to differing spindle diameters, which can be inexpensively integrated into machine tool spindles and which always achieves sufficient measuring accuracy.

The measuring system serves to monitor a spindle. It comprises, firstly, a cylindrical housing, which can be positioned in a spindle housing and can be mechanically connected to it in a fixed manner. Arranged within the housing is a carrier ring, which is mechanically connected to the housing in a fixed manner. The measuring system also includes three first sensors, for measuring a radial displacement of the spindle, and three second sensors, for measuring an axial displacement of the spindle. The first and second sensors are distributed over the circumference of the carrier ring. The sensors are encapsulated with the carrier ring.

A significant advantage of the measuring system is that, by encapsulating the sensors with the carrier ring, the sensors are optimally protected against environmental influences such as moisture, extreme temperature differences, and mechanical and chemical influences. The sensors positioned accordingly on the carrier ring are fixed in their position by the encapsulation, enabling small positioning tolerances to be achieved. The sensors are thus always in an optimum position, which ensures a sufficient measuring accuracy, of preferably 1 µm. In order to adapt to differing spindle diameters, housings and carrier rings having differing diameters, which can accordingly be combined with the sensors, may be kept available.

The measuring system may comprise at least one electronic module for the exchange of data and energy with the sensors. The at least one electronic module may also be encapsulated with the carrier ring, and is thus reliably protected against environmental influences. The electronic module may be connected to an external data processing unit. For embodiments that use several electronic modules, it has proven to be advantageous to distribute the electronic modules over the circumference of the carrier ring. The electronic modules may be connected to each other via flexible printed circuit boards.

The sensors may be realized as eddy-current sensors. In this context, it is expedient to further equip the measuring system with a first measuring ring having axial measuring surfaces, and with a second measuring ring having radial measuring surfaces. The two measuring rings can be mechanically connected to the spindle in a fixed manner. Furthermore, the measuring rings are dimensioned in such a manner that they can be arranged within the carrier ring, and the measuring surfaces can be sensed by the sensors. The measuring rings may be mechanically connected to each other in a fixed manner, such that they can easily be fastened as a unit to the spindle. Alternatively, the measuring rings may also be realized as a single component.

The housing may have an opening for feedthrough of a connection cable. The opening may be realized in such a manner that the connection cable can be fed through radially or axially.

The housing may be composed of metal. The connection cable may be connected to the housing in an electrically conductive manner, within the housing, via an electrically conductive seal. The electrically conductive seal may be realized, for example, as a textile seal or an elastomer seal.

According to an advantageous embodiment, a first sensor and a second sensor are in each case arranged in pairs. The sensor pairs in this case may be arranged with an offset of 120° in relation to each other.

BRIEF DESCRIPTION OF THE DRAWINGS

The measuring system is explained in greater detail in the following, on the basis of the single FIGURE. The FIGURE shows an exploded representation of the measuring.

DETAILED DESCRIPTION

A measuring system 01 serves to monitor a spindle of a machine tool. It comprises, firstly, a cylindrical housing 02, which may be composed of metal. The housing 02 is suitable for being arranged within a spindle housing. It can be mechanically connected to the latter in a fixed manner. There is an opening 03 made in the housing 02. A connection cable 04 can be fed radially or axially through the opening 03.

Within the housing 02, following assembly, there is a carrier ring 05, which may be composed of plastic. The carrier ring 05 is mechanically connected to the housing 02 in a fixed manner. Distributed over the circumference of the carrier ring 05 are three first sensors 07 and three second sensors 08. There is a fixed mechanical connection between the carrier ring 05 and the sensors 07, 08. The first sensors 07 serve to measure a radial displacement of the spindle, while the second sensors 08 are designed to measure an axial displacement of the spindle. The sensors 07, 08 may be realized as eddy-current sensors and/or vibration sensors and/or rotational-speed recognition sensors. A first sensor 07 and a second sensor 08 may be in each case combined in pairs. The sensor pairs are arranged with an approximately 120° offset in relation to each other.

The measuring system 01 is equipped with electronic modules 09 for exchanging data and energy with the sensors 07, 08. The electronic modules 09 are connected to each other by means of flexible printed circuit boards 10. They may be connected to an external data processing unit (not represented).

By means of an encapsulation 12, the sensors 07, 08 and the electronic modules 10 are connected to the carrier ring 05, in a permanent and mutually aligned manner.

The connection cable 04 is connected to the housing 02 in an electrically conductive manner via an electrically conductive seal 13. The electrically conductive seal 13 may be realized as a textile seal or an elastomer seal.

The measuring system 01 additionally comprises a first measuring ring 14 having axial measuring surfaces, and a second measuring ring 15 having radial measuring surfaces. The measuring rings 14, 15 can be fixedly connected to the spindle. They are dimensioned in such a manner that they can be arranged within the carrier ring, and their measuring surfaces are sensed by the sensors 07, 08, i.e. are positioned in the sensing range thereof. A first and a second measuring ring 14, 15 may be mechanically connected to each other in a fixed manner or, also, realized as a common component.

After the measuring system 01 has been attached to the spindle, relative displacements and tilting between the spindle and the spindle housing can be sensed in a contact-less manner in all three spatial directions.

LIST OF REFERENCES 01 measuring system
02 housing
03 opening
04 connection cable
05 carrier ring
06 -
07 first sensors
08 second sensors
09 electronic modules
10 flexible printed circuit boards
11 -
12 encapsulation
13 conductive seal
14 first measuring ring
15 second measuring ring

The invention claimed is:

1. A measuring system for monitoring a spindle, comprising:
a cylindrical housing, which can be positioned in a spindle housing and can be mechanically connected thereto in a fixed manner,
a carrier ring, which is arranged within the cylindrical housing and mechanically connected thereto in a fixed manner,
three first sensors for measuring a radial displacement of the spindle, and three second sensors for measuring an axial displacement of the spindle, wherein the first and second sensors are distributed over the circumference of the carrier ring and are mechanically connected to the carrier ring in a fixed manner,
wherein the sensors are encapsulated with the carrier ring,
wherein the cylindrical housing has an opening for feed-through of a connection cable.

2. The measuring system as claimed in claim 1, further comprising at least one electronic module for the exchange of data and energy with the sensors, wherein the electronic module is encapsulated with the carrier ring.

3. The measuring system as claimed in claim 2, further comprising a plurality of electronic modules, wherein the electronic modules are connected to each other via flexible printed circuit boards.

4. The measuring system as claimed in claim 1, wherein the sensors are eddy-current sensors.

5. The measuring system as claimed in claim 4, further comprising a first measuring ring having axial measuring surfaces, and a second measuring ring having radial measuring surfaces, wherein the measuring rings can be mechanically connected to the spindle in a fixed manner, and wherein the measuring rings are dimensioned in such a manner that they can be arranged within the carrier ring, and the measuring surfaces can be sensed by the sensors.

6. The measuring system as claimed in claim 5, wherein the measuring rings are mechanically connected to each other in a fixed manner.

7. The measuring system as claimed in claim 5, wherein the measuring rings are realized as a single piece.

8. The measuring system as claimed in claim 1, wherein the cylindrical housing is composed of metal.

9. The measuring system as claimed in claim 8, wherein the a connection cable is connected to the cylindrical housing in an electrically conductive manner, within the housing, via an electrically conductive seal.

10. The measuring system as claimed in claim 1, wherein the first sensors and the second sensors are in each case combined and arranged in pairs, wherein the sensor pairs are arranged with an offset of 120° in relation to each other.

11. The measuring system as claimed in claim 1, wherein the sensors are vibration sensors.

12. The measuring system as claimed in claim 1, wherein the sensors are rotational-speed recognition sensors.

13. A measuring system for monitoring a spindle, comprising:

a cylindrical housing, which can be positioned in a spindle housing and can be mechanically connected thereto in a fixed manner;

a carrier ring, which is arranged within the cylindrical housing and mechanically connected thereto in a fixed manner;

three first sensors for measuring a radial displacement of the spindle; three second sensors for measuring an axial displacement of the spindle;

a first measuring ring having axial measuring surfaces; and a second measuring ring having radial measuring surfaces, wherein the first and second sensors are distributed over a circumference of the carrier ring and are mechanically connected to the carrier ring in a fixed manner;

the sensors are encapsulated with the carrier ring;

the measuring rings can be mechanically connected to the spindle in a fixed manner; and the measuring rings are dimensioned in such a manner that they can be arranged within the carrier ring, and the measuring surfaces can be sensed by the sensors.

14. The measuring system as claimed in claim 13, further comprising at least one electronic module for the exchange of data and energy with the sensors, wherein the electronic module is encapsulated with the carrier ring.

15. The measuring system as claimed in claim 14, further comprising a plurality of electronic modules, wherein the electronic modules are connected to each other via flexible printed circuit boards.

16. The measuring system as claimed in claim 13, wherein the cylindrical housing has an opening for feedthrough of a connection cable.

17. The measuring system as claimed in claim 13, wherein the first sensors and the second sensors are in each case combined and arranged in pairs, wherein the sensor pairs are arranged with an offset of 120° in relation to each other.

18. The measuring system as claimed in claim 13, wherein the measuring rings are mechanically connected to each other in a fixed manner.

19. The measuring system as claimed in claim 13, wherein the cylindrical housing is composed of metal, wherein a connection cable is connected to the cylindrical housing in an electrically conductive manner, within the housing, via an electrically conductive seal.

20. A measuring system for monitoring a spindle, comprising:

a cylindrical housing, which can be positioned in a spindle housing and can be mechanically connected thereto in a fixed manner, a carrier ring, which is arranged within the cylindrical housing and mechanically connected thereto in a fixed manner, three first sensors for measuring a radial displacement of the spindle, and three second sensors for measuring an axial displacement of the spindle, wherein the first and second sensors are distributed over the circumference of the carrier ring and are mechanically connected to the carrier ring in a fixed manner, wherein the sensors are encapsulated with the carrier ring, wherein the first sensors and the second sensors are in each case combined and arranged in pairs, wherein the sensor pairs are arranged with an offset of 120° in relation to each other.

* * * * *